Inventor.
Harold E. Edgerton
by David Rines
Att'y.

June 18, 1940.    H. E. EDGERTON    2,205,248
SYNCHRONOUS-MOTOR-CONTROL SYSTEM
Filed June 12, 1937    6 Sheets-Sheet 4

Inventor.
Harold E. Edgerton
by David Rines
atty.

June 18, 1940.   H. E. EDGERTON   2,205,248
SYNCHRONOUS-MOTOR-CONTROL SYSTEM
Filed June 12, 1937   6 Sheets-Sheet 5

Fig. 10.

Inventor.
Harold E. Edgerton
by David Rines
atty.

June 18, 1940.   H. E. EDGERTON   2,205,248
SYNCHRONOUS-MOTOR-CONTROL SYSTEM
Filed June 12, 1937   6 Sheets—Sheet 6

Fig. 11.

Inventor.
Harold E. Edgerton
by David Rines
atty.

Patented June 18, 1940

2,205,248

UNITED STATES PATENT OFFICE 2,205,248

SYNCHRONOUS-MOTOR-CONTROL SYSTEM

Harold Eugene Edgerton, Belmont, Mass., assignor to Westinghouse Electric & Manufacturing Company, East Pittsburgh, Pa., a corporation of Pennsylvania Application June 12, 1937, Serial No. 147,963

18 Claims. (Cl. 172—289)

The present invention relates to synchronous-motor-control systems.

In copending applications, Serial No. 675,348, filed June 12, 1933, and Serial No. 111,456, filed November 18, 1936, there are disclosed novel systems for controlling a synchronous motor. After the motor is started as an induction motor, its field switch is closed to connect the field winding to a source of exciting current at the moment when there is a predetermined angular displacement, in electrical degrees, between the axis of a physical field pole and an imaginary field pole that would generate the terminal voltage on open circuit. This is the same as the angle between the axis of a physical field pole and the axis of a pole of the flux produced by the armature; or the angle between the field winding and the flux set up in the air gap by the armature currents. By suitable choice of this closing angle, it is possible to synchronize with a larger load than would otherwise be the case. By suitable adjustment, the field relay may be caused to close at the most favorable angle, for pulling into step the largest load, at the same time reducing objectionable oscillations and surges of current in the armature.

An object of the present invention is to improve upon the synchronous-motor-starting systems of the above-described applications, to the ends of simplifying the construction and reducing the expense of manufacture, but without lowering the efficiency.

Other and further objects will be described hereinafter and will be particularly pointed out in the appended claims.

The invention will now be described in connection with the accompanying drawings, in which.

Figure 1:
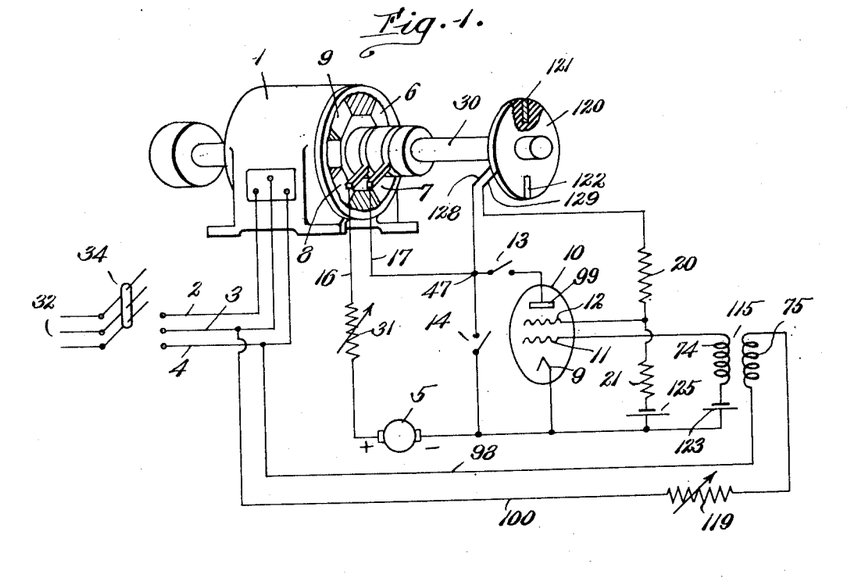
Fig. 1 is a greatly simplified diagrammatic view of circuits and apparatus arranged and constructed according to one embodiment of the present invention, many of the parts being illustrated in very rudimentary form, in order not to complicate the showing.

Referring, first, to Fig. 1, a synchronous motor 1 is shown having the usual rotor construction whereby the field poles 6, 7, 8 and 9 are caused to rotate. The stator or armature is connected by a plurality of line-conductor wires 2, 3 and 4 to an alternating-current supply of power 32 by means of a switch 34. The motor 1 is brought up to speed when these wires are energized upon the closing of the switch 34. Usually this is done through a step-down auto-transformer in order to reduce the current taken by the motor. Polyphase current from the lines causes the armature to produce a rotating magnetic field in the motor which supplies the rotor with an induction-motor torque for starting. The rotor speeds up, finally reaching a speed that depends upon the amount of load on the shaft. This rotor speed is slightly below synchronous speed and thus is slightly less than the speed of the rotating magnetic field.

Though the field of this synchronous motor is shown and described as rotating, it will be understood that the invention is equally applicable to synchronous motors in which the armature rotates.

Direct current from any source, such as a generator 5, when connected by wire conductors 16 and 17 to the field circuit including the poles 6, 7, 8, 9 through the medium of a field switching tube or relay tube 10, causes the field circuit to produce a magnetic field. The rotor poles 6, 7, 8 and 9 are either attracted or repulsed by the magnetic poles that are caused by the polyphase alternating voltage on the stator, depending upon the relative angular position.

If the field switching tube 10 becomes conducting at such an instant so that there is a force between the rotor and the stator poles tending to accelerate the rotor, then the rotating part is speeded up in such a direction as to raise the speed of the motor to synchronism. If the tube becomes conducting at such an instant so that there is a force tending to decelerate the rotor, then the rotating part is slowed down, which retards synchronism. Should the load be small enough, the motor may ultimately synchronize even if the field switch 10 becomes conducting under the worst possible conditions. If the switching is angularly controlled, however, the motor is able to pull a larger load up to synchronous speed.

The synchronous motor 1 which is to be synchronized drives, through its shaft 30, a commutating disc or wheel 120 of insulating material that has a metallic, segmental insert for each pair of poles. The inserts are spaced to correspond with the pairs of poles of the rotor. One segment can be used but it will not give as many signals. As the motor 1 is shown provided with four poles, two inserts 121 and 122 are illustrated. Two brushes 128 and 129 contact intermittently with the segments 121 and 122 as the motor rotates. The brushes 128 and 129 are in contact with the segments 121 and 122 when the rotor of the motor 1 has predetermined angular positions to a fixed plane including the axis of shaft 30. The plate circuit of the tube 10 is established, under suitable conditions, if a switch 13 is closed. The switch 13 prevents the application of the field-switching method until requirements other than angle are fulfilled, such as a definite time after starting the motor from rest or at a time when the rotor has reached a definite speed.

The field switch or relay tube 10 shown in Fig. 1 represents a gas-filled grid-controlled tube such as a thyratron, grid-glow tube, or ignitron. The relay tube 10 is shown with two control grids 11 and 12. By suitable construction, the control of the instant of starting of the tube may be made a function of the potentials upon the two grids. In this manner, the field may be caused to become energized at the proper moment, in response to suitable impulses, to realize the advantages of field-switching at the best angle, connecting the field circuit, through the wires 16 and 17, to the generator 5 which provides the exciting current.

For effecting this result, the tube 10 may be connected to operate as follows. After the main switch 34 is closed, the motor 1 comes up to a very near constant but subsynchronous speed as an induction motor. At this time, that is, after the accelerating period as an induction motor has substantially transpired, the switch 13 is closed to close the plate circuit of the tube 10, thereby to make it possible to energize the field when the grid potentials are both at the proper value. As drawn in Fig. 1, the lower grid 11 is connected to one end of the secondary winding 74 of a transformer 115, the other end of the secondary winding 74 being connected to the filament 9 of the tube. The transformer 115 is preferably of the type giving a peaked wave form of voltage when excited by the sinusoidal armature voltage supplied from the power supply 32. The sinusoidal-current wave is impressed upon the primary winding 75 of the transformer 115 by connecting it, through the medium of conductors 98 and 100 to the line conductors 3 and 4, in series with a phase-shifting network such as the series connected, adjustable impedance 119, or in any other desired manner. The illustrated connections ensure that the frequency and the phase relationship of the said sinusoidal-current (or peaked-voltage) wave shall be the same as that of the voltage of the power source 32 from which the motor 1 is driven. The peaked-voltage wave impressed upon the grid 11 through the medium of the secondary winding 74 of the transformer 115 is thus in phase with the rotating magnetic field.

The grid 12, on the other hand, is connected so that the voltage applied thereto shall be in phase with the rotor. This is effected by connecting the grid 12, through an impedance 20 and the brushes 129 and 128, to the plate supply voltage. The voltage of the grid 12 is thus controlled by the position of the rotor. The impedance 20 may comprise a resistor with or without a capacitive or inductive reactor or both.

A bias battery 123 may be inserted in the grid circuit of the grid 11, between the grid 11 and the filament 9, and a bias battery 125 in the grid circuit of the grid 12, between the grid 12 and the filament 9, in order to provide for suitable operation. These batteries, as well as other elements, are omitted from some of the figures, for clearness. An impedance 21 is connected in series with the battery 125 between the filament 9 and the grid 12. The impedance 21 may be a resistor or a combination of resistance and inductance.

Figure 7:
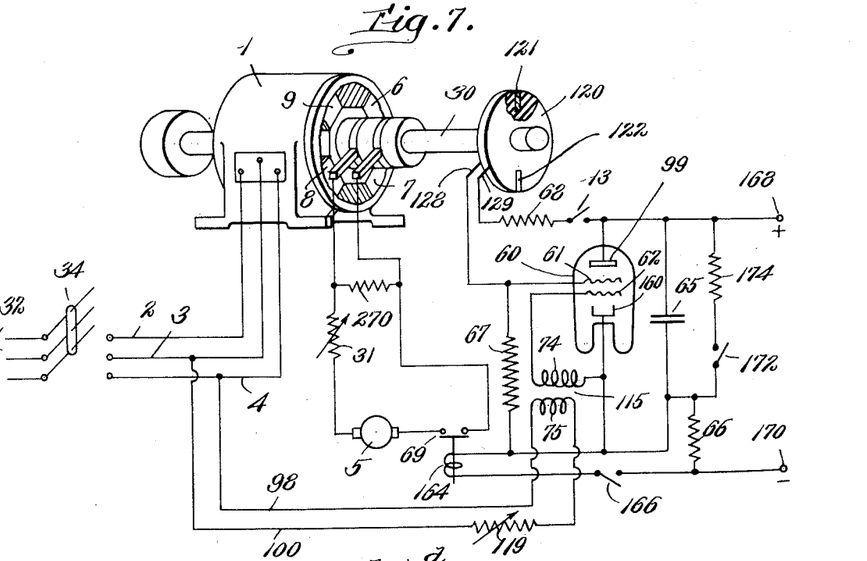
Figure 10:
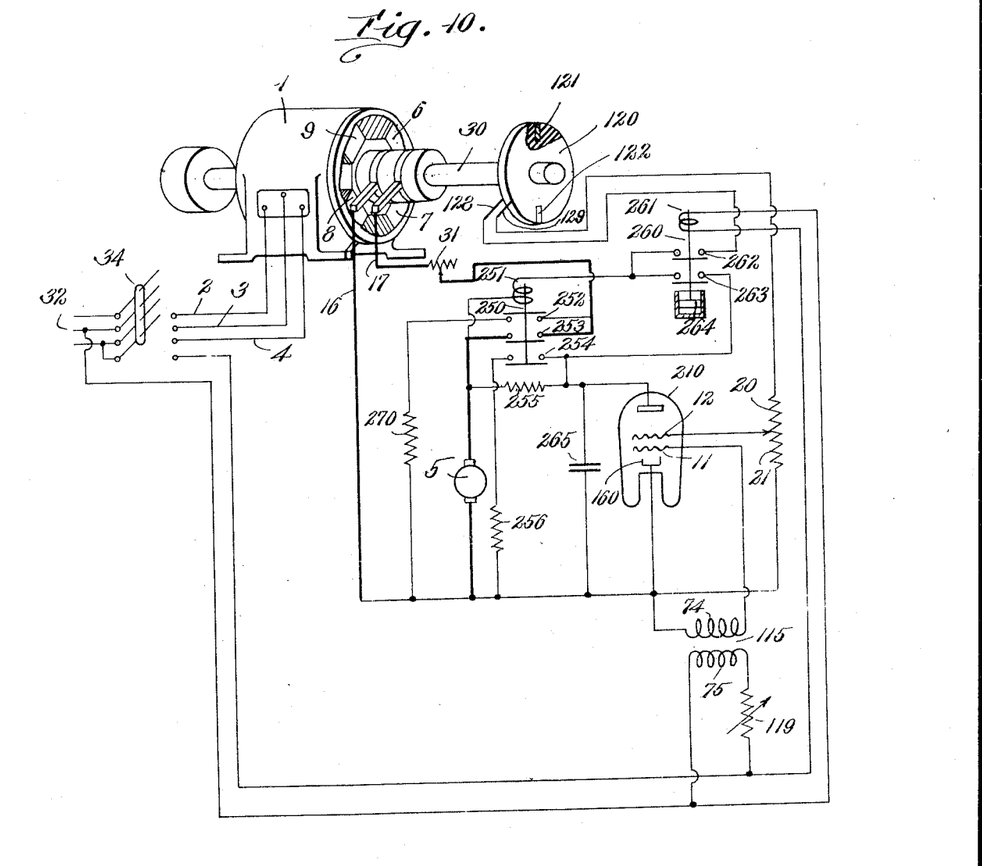
Fig. 10 is a similar view, but showing a substantially complete system.

The field circuit may be traced from the conductor 16, through a field control rheostat 31, the exciter 5, and the tube 10, with a switch 14 in parallel to the tube 10, to the conductor 17. A field-discharge resistor 270 may also be employed in parallel with the field, as illustrated in Figs. 7 and 10.

The characteristics of the tube 10 and the magnitude of the voltages on the grids 11 and 12 are adjusted so that the tube 10 does not conduct current as long as the brushes 128 and 129 are not in contact with the metallic segments 121 or 122 in the insulated disc 120, but does conduct instantly when the brushes, at a suitable point in the rotation of the shaft 30, do touch the metallic segments provided the voltage from the transformer 115 is also at the same instant at a peak value. When the segments 121 and 122 are not in contact with the brushes 128 and 129, therefore, there is no current in the resistor 20, and there is no current, therefore, in the resistor 21.

The field thus becomes energized with direct current through the relay tube 10 at the instant when simultaneous pulses of voltage are produced on both of the grids 11 and 12. Since the voltage of one of the grids, namely, the grid 11, is in phase with the rotating magnetic field, and the voltage of the other grid, namely, the grid 12, is in phase with the rotor, the simultaneous peaks for tripping occur only at some definite angular relationship between them.

The angular displacement between the rotating stator flux and the field winding, so as to provide the most favorable angle at which the field relay 10 closes, is adjustable. This angle may be adjusted to any value in many ways, as by shifting the angular position of the segment wheel 120 or brushes, selecting different phases of the supply voltage, or shifting the phase of the current in the transformer 115 by inserting phase-shifting networks in series or in parallel with it.

Figure 11:
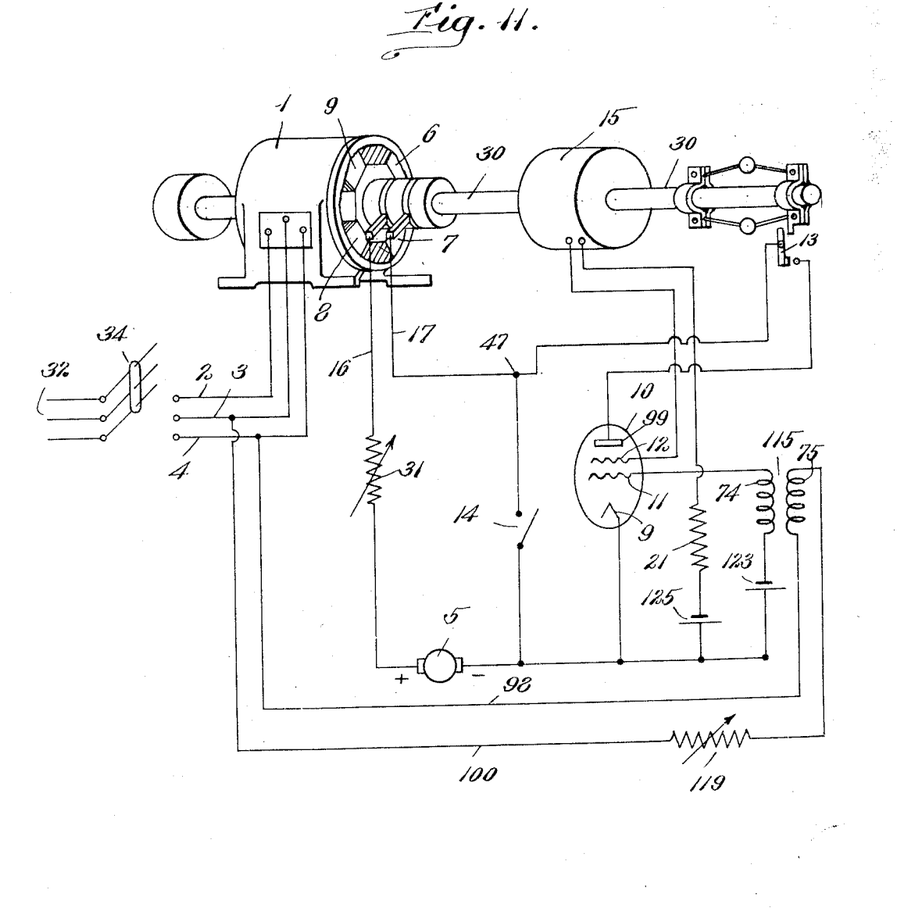
Fig. 11 is a diagrammatic view similar to Fig. 1 of another modification.

The surge or pulse of voltage may be effectively produced on the grid 12 in constant angular relationship to the rotor by a pilot generator, either direct excited, or of the reluctance or the variable-capacitance type, instead of by means of the contactor arrangement shown at 121 and 122. Fig. 11 shows the use of a pilot generator 15 in substantially the same circuit as is illustrated in Fig. 1. The pilot generator impresses a peaked-wave form between the grid and the cathode. The bias batteries 125 and 123 may or may not be needed, depending upon the electrical characteristics of the tube 10. Circuits similar to that of Fig. 11 may be employed analogous to the circuits of Figs. 2 to 7 and 10, using the pilot generator in place of the contactor arrangement. The function of the pilot generator 15 and the said contactor arrangement is the same, namely, to produce a pulse in phase with the position of the rotor.

The operation may be described as follows: Assuming the motor 1 to be at rest, the switch 34 will be closed, connecting the motor armature to the main-line conductors 2, 3 and 4, thus starting the motor by reason of the induction-motor torque. The voltage appearing on the grids 11 and 12 is normally insufficient to cause the apparatus, including the tube 10, to operate at this time. The motor will eventually, however, attain a speed near to synchronism, and will continue to operate at such speed as an induction motor. Once during each cycle, corresponding to the position of the shaft 30, the grids 11 and 12 will then be subjected to sudden pulses of voltage. These pulses of voltage will render the tube 10 conducting if they occur simultaneously, thereby causing a closing of the relay tube 10.

The said switch 14 is closed either by hand or automatically, after the relay tube 10 has operated and the motor has pulled into synchronism, in order to short-circuit the relay tube 10 during the normal operation of the motor. This switch 14 is shown diagrammatically in Figs. 1 to 4 and 11, for the sake of simplicity, and in order not to complicate the drawings. In Fig. 10, however, which shows a more complete circuit, the switch 14 is shown replaced by the relay contact elements 254. A corresponding switch 172 is described hereinafter in connection with Fig. 7.

The switch 13, too, is shown diagrammatically in Figs. 1 to 6 and 11, and it is also shown diagrammatically in Fig. 7. In the more complete showing of Fig. 10, however, this switch 13 is represented by the contact members 262, except that the contact members 262 are shown in Fig. 10 as connected in the grid circuit of the tube 210 instead of, as in the other figures, in the plate circuit of the tube 10. In this Fig. 10, these contact members 262 are shown under the control of a dash pot 264; but the automatic control of the switch 13 may be effected in other ways also. It may be operated either manually, or by a relay connected to operate as a function of speed, time, or any other factor. In Fig. 11, the switch 13 is shown diagrammatically as a centrifugal switch which may be driven by the motor shaft 30. It will be understood that the switch 13 may have various locations; for example, it may be positioned between the brush 128 and the terminal 47 in Fig. 1, instead of as shown; or in the location shown in Fig. 5; and also in other locations.

Figure 2:
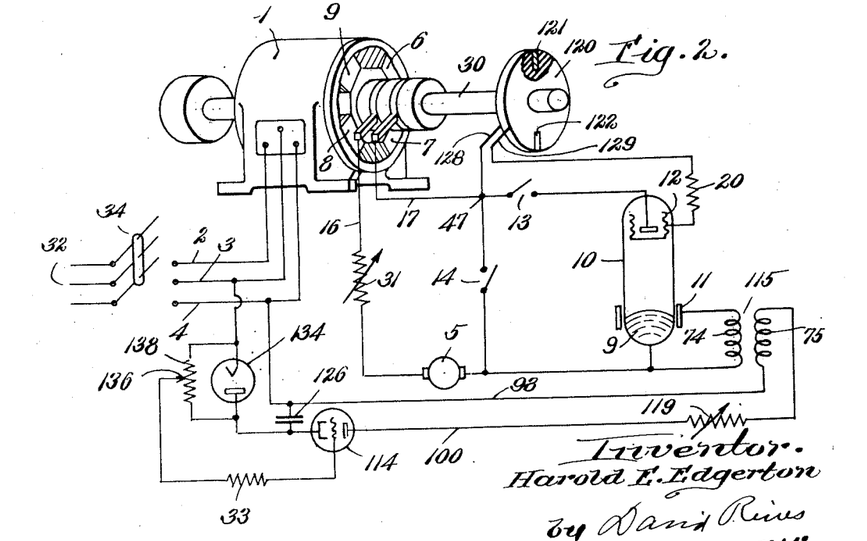
Figs. 2 to 4 are similar views illustrating the use of somewhat modified tubes and circuits.
Figure 3:
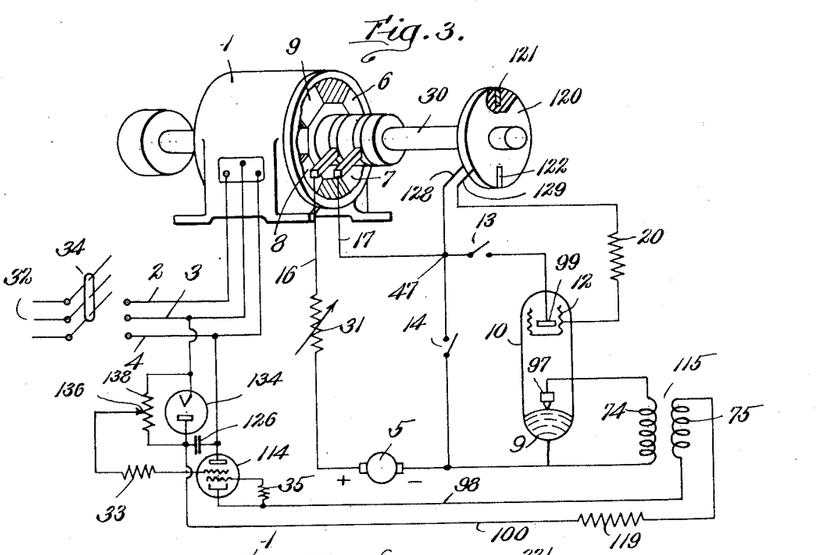

The secondary winding 74 of the transformer 115, as illustrated in Fig. 1 should have enough resistance to prevent too much current on the grid 11, so as to perform the function of a protective resistor, thereby to prevent a current flow through the tube 10 until it is desired; otherwise an additional protective resistor should be employed. A protective resistor 33 is shown, for example, in the plate circuit of the small gas-filled grid-controlled relay tube 114 in Figs. 2 and 4 to keep the grid current of the tube 114 from getting too high. Two such protective resistors, 33 and 35, are shown in Fig. 3, one for each of the two grids of the corresponding multiple-grid tube 114 of Fig. 3. Protective resistors 33 and 35 are similarly shown provided for the respective grids of the multiple-grid tubes 50 and 51 of Fig. 6.

The tube 10 may be of the hot-cathode, arc-discharge, grid-controlled type. It may, however, be replaced by any of a large number of other types of apparatus; for example, it may be of the mercury-pool or ignitron type, with a mercury-pool cathode 9, as illustrated in Figs. 2 and 3. Minor modifications in the circuit as shown in Fig. 1 are then desirable.

The starting-band grid electrode 11 of the tube 10 in Fig. 2 may be of the same type as is described in application, Serial No. 610,045, filed May 9, 1932. The action is the same with the ignitron tube 10 of Fig. 3, having an internal ignitor starter 97, instead of the external starting band 11.

The circuit of Fig. 1 is adapted to operate at relatively low voltage; it may require 100 volts or less to trip the tube 10. The circuits of Figs. 2 and 3, on the other hand, are adapted to relatively high voltages. It may require a voltage of from 7000 to 40,000 volts on the grid 11 of Fig. 2 or several amperes through the ignitor 97 of Fig. 3 before the corresponding tube will operate.

In connection with the use of the tube 10 of Figs. 2 and 3, it is desirable to use a circuit that gives a sudden impulse to the starting grid 11 or the ignitor 97. This circuit stores up energy in the capacitor 126 and suddenly discharges it through the transformer 115 at the desired instant of time.

Figure 4:
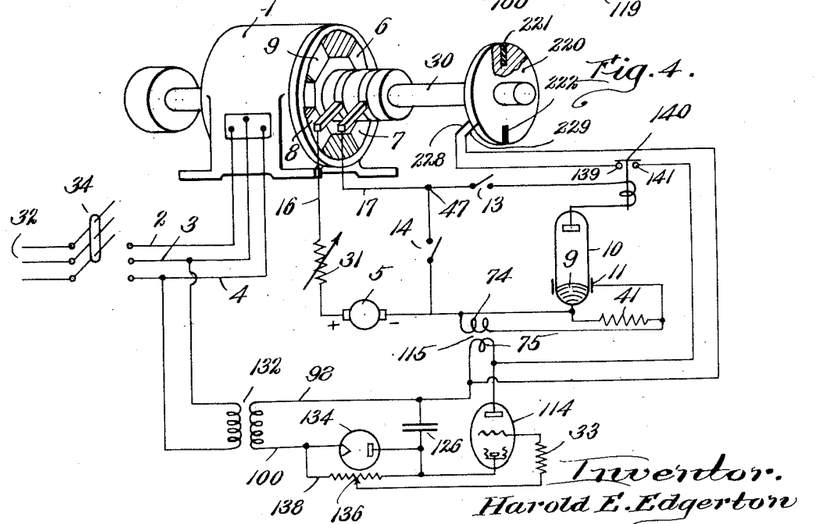

In Figs. 2 and 3, the mercury-arc relay tubes 10 are shown provided not only with the grid 11, but also with a grid 12 surrounding the anode, though the grid 12 may be omitted, as illustrated in Fig. 4.

The primary winding 75 of the transformer is shown in Figs. 2 and 3 connected to the line conductors 3 and 4 through the medium of the gas-filled grid-controlled relay tube 114, connected to the line conductors 3 and 4, in series with a rectifier 134. In Fig. 4, the corresponding connections are shown through a transformer 132.

The grid 11 is energized by a pulse through the transformer 115, preferably by a discharge through the condenser 126, controlled by the small gas-filled control tube 114, as is described in the said application, Serial No. 610,045. Although the grid 11 momentarily makes it possible for the tube 10 to start each cycle, it is prevented from starting until the grid 12 is energized at the identical instant, as has been described before.

The charging condenser 126 is shown connected in Figs. 2, 3 and 4 between the cathode and the plate of the relay tube 114; in Figs. 2 and 3, this connection is in series with the primary winding 75 of the starting transformer 115. The grid of the relay 114 of Figs. 2 and 4, and one of the grids of the relay 114 of Fig. 3, is adjustably connected at 136 to the phase-shifting resistor 138, which is shunted across the rectifier 134. The resistor 138 thus serves as a potentiometer to shift the phase of the starting point of the rectifier tube 10. The tube 10 is tripped at a point determined by the adjustment of the potentiometer 138 at 136 to initiate the discharge on the tube 10. The phase-shifting resistor 119 of Fig. 1 and other figures is thus replaced in Figs. 3 and 4 by the phase-shifting resistor 138. Both phase shifters 119 and 136 may, however, be employed, as illustrated in Fig. 2, where the resistor 119 serves additionally to adjust the intensity of the voltage on the grid 11.

In Fig. 4, although only a single grid 11 is shown for the tube 10, the effect of a further grid is obtained by the insulating segments 221 and 222 when they engage the brushes 228 and 229 to deenergize the grid transformer 115. Two circuits, therefore, work in parallel into the grid circuit: the discharging circuit for the condensers 126 and the circuit of the brushes 228 and 229. This permits the operation of the tube 10 when the discharge of the condenser 126 takes place simultaneously with the bridging of the brushes 228 and 229 by the segments 221 or 222.

In the circuit of Fig. 1, the tube will not operate until both grids 11 and 12 are simultaneously energized. In the circuit of Fig. 4, the said two circuits must similarly operate simultaneously to initiate operation of the tube 10.

In the modification of Fig. 4, to summarize, the starting grid 11 is prevented from starting the tube 10 as long as the primary winding 75 of the transformer 115 is short circuited by the brushes 228 and 229 and the metal disc 220. At some predetermined angle, the brushes 228 and 229 will be insulated from each other at the same instant that the grid-controlled gas-filled discharge tube 114 operates, and the surge of current from the condenser 126 will then cause the tube 10 to operate instantly.

A relay 140 having an actuating winding in the plate circuit of the tube 10 is raised as soon as field current flows, thus opening, at contact members 139 and 141, the circuit that short-circuits the primary winding 75 of the transformer 115. This relay 140 is not essential, since the tube 10 will continue to conduct even if there is no grid excitation, as long as the current flows. The tube 10 may go out if there are violent surges in the field current that tend to reverse the flow of current. With grid excitation as shown, the tube will be ready to start within one cycle after going out.

A resistor 41 is shown in Fig. 4 in parallel to the secondary winding 74 for damping oscillations of the voltage in the secondary winding 74.

Figure 5:
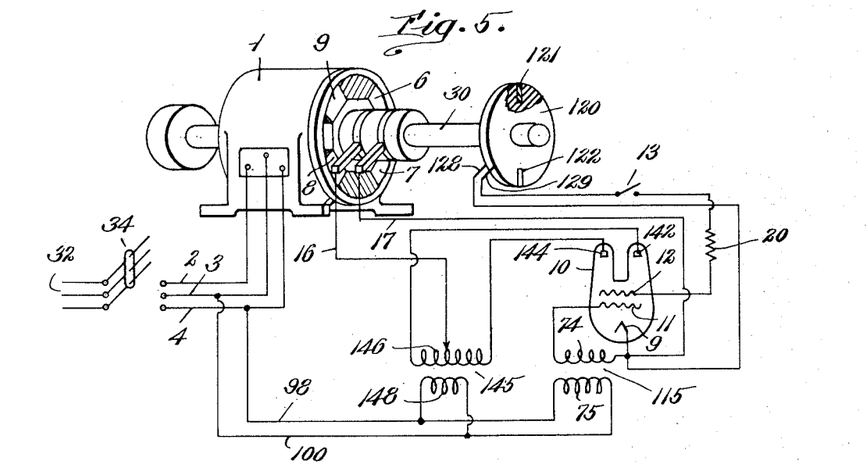
Fig. 5 is a similar view illustrating the substitution of alternating current for the excitation of Figs. 1 to 4.

Since the tube 10 is a rectifier as well as a relay, the applied field voltage may be from an alternating-current supply. The exciter 5 may, therefore, be replaced by a transformer 145, as illustrated in Fig. 5, the tube 10 of which is shown as a full-wave grid-controlled rectifier tube for supplying excitation to the field. If this is done, it is desirable to use full-wave or polyphase rectification, since the field circuit is inductive, as is well understood. The functions of the grids 11 and 12 of Fig. 5 are the same as described before, but two anodes 142 and 144 are provided for full-wave rectification. The anodes are connected to the secondary winding 146 of the transformer 145, the primary winding 148 being connected, in parallel with the primary winding 75, to the line conductors 3 and 4. The voltage on the grid 11 should be peaked in wave form.

Figure 6:
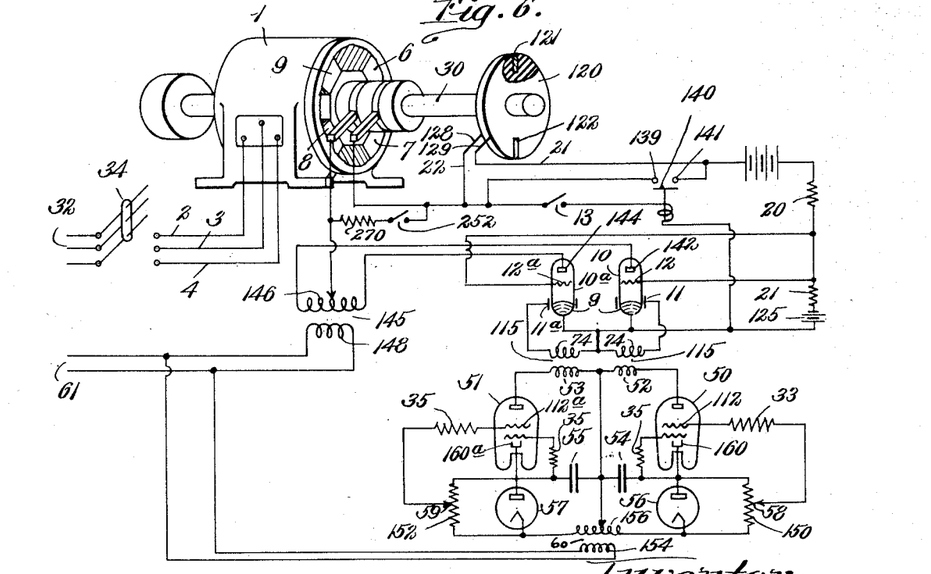
Figs. 6 and 7 are similar views of further modifications, illustrating the use of other types of tubes, Fig. 7 being a more complete diagram than Figs. 1 to 6.

Two separate grid-controlled rectifier tubes 10 and 10a may be used, as shown in Fig. 6. These may be mercury-pool tubes with external starting bands 11, as in Fig. 2, or ignitors 97, as in Fig. 3, connected as a full-wave rectifier to supply field current. It is necessary to supply an initiating voltage to the grids 11 and 11a of these tubes at the proper part of each cycle of applied voltage unless provision is made for holding over the arc in these tubes. One such circuit, for starting each rectifier at the proper part of each cycle, is shown in Fig. 6 below the grid-controlled tubes 10 and 10a. Such circuit may comprise two double-grid tubes 50 and 51, of the type described in application, Serial No. 48,669, filed November 7, 1935, by K. J. Germeshausen, and provided with caesium-liberating or equivalent cathodes 100 and 100a. These tubes 50 and 51 are connected so as suddenly to discharge condensers 54 and 55, once each cycle, into the primary windings 52 and 53 of impulse transformers 115, because they may be of the same type above described by that reference number, and their secondary windings 74 are shown connected to the starting electrodes 11 and 11a. One grid 112 and 112a of each tube 50 and 51 is shown adjustably connected at 58 and 59 to the phase-shifting resistors 150 and 152, that are shown shunted across rectifiers 56 and 57 to permit the selection of the desired part of the voltage at which the pulse occurs. The resistors 150 and 152, like the resistor 138, thus serve as potentiometers to shift the phase of the starting point of the rectifier tubes 10, 10a. The tubes 50 and 51 trip at a point determined by the adjustments at 58 and 59 to initiate the discharge in the tubes 10 and 10a. This type of control of the output is commonly termed "phase-control."

The primary winding 148 of the transformer 145 is shown connected to a source of alternating-current supply 61, which must be the same supply that drives the motor. The primary winding 154 of a transformer 60 must be connected to the same source 61 of alternating-current power and their secondary polarities must be connected properly in order that the voltage pulses on the grids 11 and 11a occur when the plate voltages of the tubes 10 and 10a are positive with respect to the cathode. The secondary winding 156 of the transformer 60 is shown connected at its ends to the filaments of the rectifiers 56 and 57.

The relay 140 closes the contact members 139 and 141 as soon as the tubes 10 and 10a start, thus short-circuiting the brushes 128 and 129 and thereby permitting the tubes 10 and 10a to operate continuously.

The arrangement shown in Fig. 4 for starting the tube 10 is also directly adaptable to the full-wave rectifier arrangement described in connection with Fig. 6.

If desired, the circuit of Fig. 1 may be modified in the manner of the other figures to operate a mechanical field switch 69 for closing the circuit of the exciter 5, as illustrated in Fig. 7. The tube 60 may be of the double-grid type described in the said Germeshausen application, provided with grids 61 and 62, a cathode 160 and an anode 99. The grid 62 is controlled through the transformer 115, as in Fig. 1; and the grid 61 is connected to the brush 128, also as in Fig. 1. The plate 99 is shown connected to the brush 129, through a resistance 68, by means of a switch 13. The tube may be energized, at the times controlled by the voltages applied to the grids, by a condenser 65, connected in series with the actuating coil 164 of the field switch 69 across a source of direct current by a switch 166. One of the terminals of the direct-current source is shown at 168 and the other terminal at 170. The coil 164 and the switch 166 are shunted by a resistance 66. The condenser 65 may be short-circuited by a switch 172, shown in series with a resistance 174. The grid 62 and the cathode 160 are shunted by a resistance 67. The resistor 66 is large compared to the coil of the field switch 69 but is small enough to charge the condenser 65 during the acceleration period.

The switch 172 is closed immediately after the tube 60 operates and the current through the resistor 174 is used to hold-in the coil 164 on the field relay 69.

Returning to Fig. 7, the switch 13 is kept open until the motor is run up to speed by induction-motor forces. When this switch is closed, preferably by automatic means, as a function of time or speed, the circuit is ready to operate at the first time that the angle is right.

As previously discussed, the double-grid tube 50, 51 or 60 operates at the instant that both grids are energized, one by a pulse of voltage from the peaking transformer 115 and the other by a voltage at the instant the brushes 128 and 129 make contact with the segments 121 and 122. The tubes 50, 51 and 60 have unusual characteristics, as will now be explained.

Figure 8:
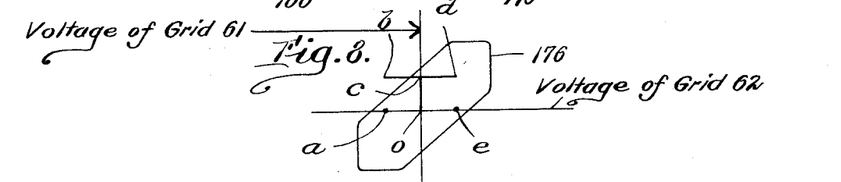
Figs. 8 and 9 are diagrammatic views illustrating the operation of the tube shown in Fig. 7.

The tubes 50 and 51 are connected into circuits of such nature that other tubes, such as thyratrons, might serve equally as well. For a full understanding of Fig. 7, however, it will be desirable to explain the peculiar properties of the tube disclosed in the said Germeshausen application. The characteristic curves showing the grid voltages for starting the tube are shown in Fig. 8. Instantaneous values of the voltages on the grids 61 and 62, plotted as a function of time, are shown in Fig. 9; that is, the curve $f$ represents the voltage on the grid 62 as a function of time and the curve $g$ represents the voltage on the grid 61 as a function of time.

The axis of abscissa corresponds to the voltage of the grid 62 and the axis of ordinates corresponds to the voltage of the grid 61. Voltages $a$ and $e$ (Fig. 9) are applied to the grid 62 over the range between the points $a$ and $e$. At the origin $o$, the brushes 128 and 129 are open; at the point $c$, directly above the point $o$, they are closed. When these brushes 128 and 129 are closed, the voltage is as represented by the peak $c$ of the curve $g$ in Fig. 9. The points $b$ and $d$ are directly above the points $a$ and $e$ at a distance $oc$. The region of non-conduction of the tube 60 is represented inside the characteristic starting curve 176 of the tube 60; that is, the tube will not operate if the two grid voltages determine a point inside the curve 176. The tube operates only at points corresponding to those outside of the curve, as at point $b$, and operates as soon as the border is passed.

Figure 9:
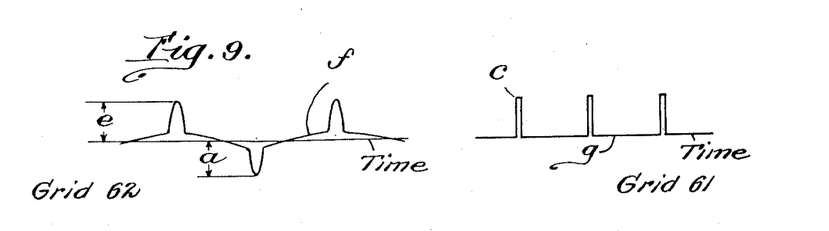

The point $a$ in Fig. 8 corresponds to the negative peak amplitude $a$ of the curve $f$ of Fig. 9; that is, the instantaneous grid voltage in the grid 62 at the negative peak $a$ is shown in Fig. 8 at $a$. Similarly, the positive peak amplitude $e$ of the curve $f$ of Fig. 9 corresponds to a point $e$ of Fig. 8. The peak voltage $c$ of the curve $g$ of Fig. 9 is represented in Fig. 8 at $c$.

If the peak grid voltages at $a$ and at $c$, Fig. 9, come at the same instant of time, the tube 60 will operate, since the point $b$ on the characteristic curve 176, Fig. 8, is outside of the boundary. As the motor slips, the occurrence of the above condition will eventually take place, thereby switching the field at the desired angle.

The element 119 serves, in Fig. 7, both as a phase shifter and a protective resistor, performing thus a double function, as described above in connection with the transformer winding 75. This is not the most approved form of phase shifting, but it is an easy and simple form that does not require unusual complications in the drawing. It is quite effective for a phase shift of as much as 30 degrees, and this is amply sufficient for ordinary purposes if the operation is maintained in the proper range. It is disadvantageous, in the system of Fig. 7, to change the phase by varying the element 119 too much, because such change involves a change in the magnitude of the voltage in the transformer winding 74 and the grid 62.

A more approved system, with greater complexities, is illustrated in Fig. 10. An actuating coil 261 for a relay 260 is connected, in parallel with the primary winding 75 of the transformer 115, to the conductors 3 and 4. Not only does closing the field switch 34 start the motor, therefore, but it also energizes the actuating coil 261 of the relay 260. A dash pot 264, as before indicated, however, prevents this relay from closing until a definite time has passed, during which time the motor comes up nearly to full speed. The relay 260 closes two circuits: first, through the medium of the contact members 262, it connects the brushes 128 and 129 to the grids of the tube 210; and secondly, through the medium of one of the contact members 263, it connects an energizing coil 251 of a relay or field switch 250 across a resistance 255 and in series with the exciter 5 and the condenser 265. The relay 250 does not operate at the instant of closing of the relay 260, but it does operate at the first time thereafter that the angle is right, as determined by the setting of the contact members 121 and 122 and the phase-shifting circuit 119.

Contact members 253 on the relay 250 carry the main field current, traversing the heavy-line field circuit extending from the conductor 16, through the exciter 5, through the contact members 253 to the conductor 17. Contact members 252 are used to open-circuit the field-discharge resistor 270 after the exciter has been connected. Contact members 254 close a hold-in circuit through the resistance 256, which keeps the relay 250 from opening.

The action of the tube 210, which suddenly discharges the condenser 265, is the same as has been described in connection with Fig. 7.

Further modifications will occur to persons skilled in the art, and all such are considered to fall within the spirit and scope of the invention, as defined in the appended claims.

What is claimed is:

1. In an electric system comprising a synchronous motor having two elements, namely, a stator and a rotor, one of the elements being an armature and the other element being a field winding, means for connecting the armature to a source of alternating current, means comprising a gas-containing grid-controlled tube for connecting the circuit of the field winding to a source of direct current, whereby the alternating voltage supplied to the armature from the source of alternating current produces a magnetic field that rotates in space at a synchronous speed, and whereby the direct voltage applied to the field winding from the source of direct current produces a second magnetic field which rotates at synchronous speed when the motor is operating at synchronous speed and which reacts upon the first-named magnetic field to produce a torque that is a function of the angle of displacement between the said magnetic fields, a second gas-filled tube in the field circuit, the second-named tube having two grids and being normally non-conducting, and means rotatable in synchronism with the rotor and controlled in accordance with the voltage of the source of alternating current for controlling the grids to render the second-named tube conducting at a predetermined angle of displacement between the said magnetic fields.

2. In an electric system comprising a synchronous motor having two elements, namely, a stator and a rotor, one of the elements being an armature and the other element being a field winding, means for connecting the armature to a source of alternating current, a relay comprising a gas-containing tube havng two grids for connecting the circuit of the field winding to a source of direct current, whereby the alternating voltage supplied to the armature from the source of alternating current produces a magnetic field that rotates in space at a synchronous speed, and whereby the direct voltage applied to the field winding from the source of direct current produces a second magnetic field which rotates at synchronous speed when the motor is operating at synchronous speed and which reacts upon the first-named magnetic field to produce a torque that is a function of the angle of displacement between the said magnetic fields, the tube being normally non-conducting, a conducting member rotatable in synchronism with the rotor, two conducting members cooperative with the first-named conducting member, and means controlled by the conducting members for energizing one of the grids to render the tube conducting at a predetermined angle of displacement between the said magnetic fields.

3. In an electric system comprising a synchronous motor having two elements, namely, a stator and a rotor, one of the elements being an armature and the other element being a field winding, means for connecting the armature to a source of alternating current, a relay comprising a gas-containing tube having two grids for connecting the circuit of the field winding to a source of direct current, whereby the alternating voltage supplied to the armature from the source of alternating current produces a magnetic field that rotates in space at a synchronous speed, and whereby the direct voltage applied to the field winding from the source of direct current produces a second magnetic field which rotates at synchronous speed when the motor is operating at synchronous speed and which reacts upon the first-named magnetic field to produce a torque that is a function of the angle of displacement between the said magnetic fields, the tube being normally non-conducting, and means for applying a voltage to one of the grids in phase with one of the said magnetic fields and for applying a voltage to the other grid in phase with the other of the said magnetic fields to render the tube conducting at a predetermined angle of displacement between the said magnetic fields.

4. In an electric system comprising a synchronous motor having two elements, namely, a stator and a rotor having a pair or pairs of poles, one of the elements being an armature and the other element being a field winding, means for connecting the armature to a source of alternating current, a relay comprising a gas-containing grid-controlled tube for connecting the circuit of the field winding to a source of direct current, whereby the alternating voltage supplied to the armature from the source of alternating current produces a magnetic field that rotates in space at a synchronous speed, and whereby the direct voltage applied to the field winding from the source of direct current produces a second magnetic field which rotates at synchronous speed when the motor is operating at synchronous speed and which reacts upon the first-named magnetic field to produce a torque that is a function of the angle of displacement between the said magnetic fields, the tube being normally non-conducting, a member rotatable in synchronism with the rotor and having a plurality of parts equal in number to, and spaced to correspond with, the pair or pairs of poles of the rotor, and means controlled by the member for rendering the tube conducting.

5. In an electric system comprising a synchronous motor having two elements, namely, a stator and a rotor having a pair or pairs of poles, one of the elements being an armature and the other element being a field winding, means for connecting the armature to a source of alternating current, a relay comprising a gas-containing grid-controlled tube for connecting the circuit of the field winding to a source of direct current, whereby the alternating voltage supplied to the armature from the source of alternating current produces a magnetic field that rotates in space at a synchronous speed, and whereby the direct voltage applied to the field winding from the source of direct current produces a second magnetic field which rotates at synchronous speed when the motor is operating at synchronous speed and which reacts upon the first-named magnetic field to produce a torque that is a function of the angle of displacement between the said magnetic fields, the tube being normally non-conducting, an insulating disc rotatable in synchronism with the rotor and having a plurality of conducting segments equal in number to, and spaced to correspond with, the pair or pairs of poles of the rotor, two brushes for contacting with the conducting segments, and means for connecting one of the brushes to the grid and the other brush to another portion of the tube to render the tube conducting.

6. In an electric system comprising a synchronous motor having two elements, namely, a stator and a rotor having a pair or pairs of poles, one of the elements being an armature and the other element being a field winding, means for connecting the armature to a source of alternating current, a relay comprising a gas-containing grid-controlled tube for connecting the circuit of the field winding to a source of direct current, whereby the alternating voltage supplied to the armature from the source of alternating current produces a magnetic field that rotates in space at a synchronous speed, and whereby the direct voltage applied to the field winding from the source of direct current produces a second magnetic field which rotates at synchronous speed when the motor is operating at synchronous speed and which reacts upon the first-named magnetic field to produce a torque that is a function of the angle of displacement between the said magnetic fields, the tube being normally non-conducting, a conducting disc rotatable in synchronism with the rotor and having a plurality of insulating segments equal in number to, and spaced to correspond with, the pair or pairs of poles of the rotor, two members for contacting with the disc and adapted to be bridged by the insulating segments, and means for connecting one of the contacting members to the grid and the other contacting member to another portion of the tube circuit to render the tube conducting.

7. In an electric system comprising a synchronous motor having two elements, namely, a stator and a rotor, one of the elements being an armature and the other element being a field winding, means for connecting the armature to a source of alternating current, a transformer having a primary winding connected to the source and a secondary winding, and means responsive to a selected position of the field winding with reference to the rotating field in the armature for connecting said field winding to said secondary winding, said means comprising a gas-containing grid-controlled tube and means for controlling the grid of the tube from the rotatable part of the motor.

8. In an electric system comprising a synchronous motor having two elements, namely, a stator and a rotor, one of the elements being an armature and the other element being a field winding, means for connecting the armature to a source of alternating current, a grid-controlled rectifier for connecting the circuit of the field winding to the source, whereby the alternating voltage supplied to the armature from the source of alternating current produces a magnetic field that rotates in space at a synchronous speed, and whereby the direct voltage applied to the field winding from the rectifier produces a second magnetic field which rotates at synchronous speed when the motor is operating at synchronous speed and which reacts upon the first-named magnetic field to produce a torque that is a function of the angle of displacement between the said magnetic fields, a condenser for energizing the grid of the rectifier, and means for charging and discharging the condenser in synchronism with the frequency of the alternating-current source.

9. In an electric system comprising a synchronous motor having two elements, namely, a stator and a rotor, one of the elements being an armature and the other element being a field winding, means for connecting the armature to a source of alternating current, two grid-controlled rectifiers for connecting the circuit of the field winding to the source, whereby the alternating voltage supplied to the armature from the source of alternating current produces a magnetic field that rotates in space at a synchronous speed, and whereby the direct voltage applied to the field winding from the rectifier produces a second magnetic field which rotates at synchronous speed when the motor is operating at synchronous speed and which reacts upon the first-named magnetic field to produce a torque that is a function of the angle of displacement between the said magnetic fields, two condensers, one for energizing the grid of each rectifier, two grid-controlled tubes for respectively controlling the condensers, and means for controlling the grid of the last-named tubes in synchronism with the frequency of the alternating-current source.

10. In an electric system comprising a synchronous motor having two elements, namely, a stator and a rotor, one of the elements being an armature and the other element being a field winding, means for connecting the armature to a source of alternating current, a mechanical relay for connecting the circuit of the field winding to a source of direct current, whereby the alternating voltage supplied to the armature from the source of alternating current produces a magnetic field that rotates in space at a synchronous speed, and whereby the direct voltage applied to the field winding from the source of direct current produces a second magnetic field which rotates at synchronous speed when the motor is operating at synchronous speed and which reacts upon the first-named magnetic field to produce a torque that is a function of the angle of displacement between the said magnetic fields, a normally ineffective grid-controlled tube for controlling the actuation of the relay, a condenser for rendering the grid-controlled tube effective, and means for permitting the condenser to render the grid-controlled tube effective, the last-named means being controlled in accordance with the angle of displacement between the said magnetic fields.

11. In a system of control for starting a synchronous motor, in combination, a synchronous motor having an armature winding, a field winding, and a damper winding constituting a starting means to start the motor as an induction motor upon energization of the armature by alternating current, a source of alternating current, means for connecting the armature to the source of alternating current, a source of direct current, switching means for connecting the field winding to the source of direct current, and control means, said control means including impulse means interconnected with said source of alternating current and adapted to produce impulses of electric energy each time the rotating field in the armature winding takes some selected position, an impulse generator, driven by the rotor of the motor, adapted to generate impulses of electric energy each time the rotor of the motor takes a selected position, and means, responsive to the magnitude of the combined impulse of the impulses of energy produced by said impulse means and impulse generator, adapted to cause the operation of said switching means.

12. In a system of control, in combination, a coil, a source of direct current, a switch for connecting the coil to the source of direct current, an impulse generator driven at a variable speed adapted to produce impulses of electric energy of varying frequency and varying magnitude, a source of alternating current, an impulse transformer connected to said source of alternating current adapted to produce impulses of electric energy of a certain magnitude and frequency, and means, responsive to the magnitude of the impulse resulting from the combined action of said transformer and impulse generator, adapted to operate said switch.

13. In a system of control for starting a synchronous motor, in combination, electrical impulse producing means including an element mounted in a selected relationship with reference to the field windings of the motor, adapted to cause electric impulses which impulses will thus indicate each time the field winding holds a given position in space, a second electric impulse producing means energized from the source of supply of alternating current whereby impulses are produced having a frequency equal to the frequency of the source of alternating current supply, and control means responsive to the combined impulses of the two impulse producing means adapted to energize the field winding with direct current.

14. In a system of control for starting a synchronous motor having an armature winding, or stator, and a field winding, or rotor, a source of alternating current, means adapted to connect the source of alternating current to the armature winding to produce a rotating field in said armature winding, means coupled to the field winding adapted to produce the positive portion of an alternating voltage wave each time the field winding holds a given position with reference to the armature winding, means interconnected with the source of alternating current adapted to produce the positive portion of a voltage wave each time the given point on the rotating field in the armature has a selected position with reference to the stator, an electric discharge device adapted to become conducting when said positive portions of the two voltage waves are in phase, and means adapted to energize the field winding with direct current in response to the operation of the breakdown of the electric discharge device.

15. In a system of control for starting a synchronous motor, in combination, an impulse generator, mounted in a selected relation with reference to the field windings of the motor, adapted to generate impulses of electric energy which impulses will thus indicate each time the field winding holds a given position in space, impulse means energized from the source of supply of alternating current whereby impulses are produced of a frequency equal to the frequency of the source of alternating current supply, and control means responsive to the combined impulses of the impulse generator and the impulse means adapted to energize the field winding with direct current.

16. In a system of control for starting a synchronous motor, in combination, an impulse generator, mounted in a given position with reference to the field windings of the motor, adapted to generate impulses of electric energy which impulses indicate each time the field windings hold a given position in space, impulse means energized from the source of supply of alternating current whereby impulses of electric energy are produced having a frequency equal to the frequency of the supply and each impulse having a given position with reference to a given point on the wave of alternating current giving rise to the impulse, and control means responsive to the combined effect of the impulses of the impulse generator and the said impulse means.

17. A system of control for a synchronous motor, in combination, a synchronous motor having an armature winding and a field winding mounted on pole pieces, a source of alternating current, a source of direct current, switching means adapted to connect the armature winding to the source of alternating current to start the motor as an induction motor, switching means adapted to connect said field winding to said source of direct current, and electronic control means including means operable to produce an electrical effect each time the instantaneous voltage of the source of alternating current being supplied to the armature winding passes through a given value, means operable to produce an electrical effect each time a given point on the rotor holds a given position in space, and means, responsive to the joint electrical effects of the last two means mentioned, adapted to effect the operation of the switching means for connecting the field winding to the source of direct current.

18. In a system of control, in combination, a source of alternating current, a dynamo-electric machine adapted to be connected to said source of alternating current to be operated thereby, said dynamo-electric machine having a rotor and windings on the rotor, circuit connections for the rotor windings, and control means including a device operable to produce an electrical effect each time the instantaneous voltage of the source of alternating current being supplied to the dynamo-electric machine passes through a given value, a device operable to produce an electrical effect each time a given point on the rotor holds a given position in space, and means, responsive to joint electrical effects of the devices mentioned, adapted to control the circuit arrangement of the windings on the rotor with the said circuit connections.

HAROLD E. EDGERTON.